(12) United States Patent
Jung (10) Patent No.: US 10,678,299 B2
(45) Date of Patent: Jun. 9, 2020

(54) DISPLAY DEVICE

(71) Applicant: SAMSUNG DISPLAY CO., LTD., Yongin-Si, Gyeonggi-Do (KR)

(72) Inventor: Taehyeog Jung, Hwaseong-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 16/406,537

(22) Filed: May 8, 2019

(65) Prior Publication Data

US 2020/0019212 A1 Jan. 16, 2020

(30) Foreign Application Priority Data

Jul. 16, 2018 (KR) .......................... 10-2018-0082378

(51) Int. Cl.
*G06F 1/16* (2006.01)

(52) U.S. Cl.
CPC .......... *G06F 1/1616* (2013.01); *G06F 1/1641* (2013.01)

(58) Field of Classification Search
CPC combination set(s) only.
See application file for complete search history.

(56) References Cited

U.S. PATENT DOCUMENTS

| 3,784,086 A * | 1/1974 | Forbes, Jr. | B65D 27/00 383/106 |
| 9,013,864 B2 * | 4/2015 | Griffin | H04M 1/0216 16/382 |
| 9,535,452 B2 | 1/2017 | Ahn | |
| 9,661,719 B2 * | 5/2017 | Jang | H05B 33/22 |
| 9,911,793 B2 | 3/2018 | Lee et al. | |
| 9,939,847 B2 * | 4/2018 | Kee | G06F 1/1616 |
| 10,029,446 B2 * | 7/2018 | Lee | B32B 7/12 |
| 10,331,173 B2 * | 6/2019 | Cho | G06F 1/1652 |
| 10,362,696 B2 * | 7/2019 | Ahn | H05K 5/0226 |
| 2016/0062391 A1 * | 3/2016 | Choi | H04M 1/0266 361/679.03 |
| 2017/0068275 A1 | 3/2017 | Lee et al. | |
| 2017/0153668 A1 | 6/2017 | Jang et al. | |
| 2017/0352834 A1 | 12/2017 | Kim et al. | |
| 2018/0295735 A1 * | 10/2018 | Ahn | G06F 1/1652 |
| 2019/0204867 A1 * | 7/2019 | Song | G06F 1/1616 |

FOREIGN PATENT DOCUMENTS

| KR | 10-2014-0142004 A | 12/2014 |
| KR | 10-2016-0118407 A | 10/2016 |
| KR | 10-2017-0030023 A | 3/2017 |
| KR | 10-2017-0036190 A | 4/2017 |
| KR | 10-2017-0064453 A | 6/2017 |
| KR | 10-2017-0137984 A | 12/2017 |

* cited by examiner

*Primary Examiner* — Lisa Lea-Edmonds
(74) *Attorney, Agent, or Firm* — Lewis Roca Rothgerber Christie LLP (57) ABSTRACT

A display device includes: a display module including a folding area that is configured to be in-folded around a folding axis, and non-folding areas adjacent to both sides of the folding area, the folding area and the non-folding areas configured to be defined on a plane, the display module configured to display an image; a support member at a lower part of the display module; an adhesive member between the display module and the support member; and a non-adhesive member between the adhesive member and the display module in the folding area.

20 Claims, 10 Drawing Sheets

DISPLAY DEVICE

CROSS-REFERENCE TO RELATED APPLICATION

This patent application claims priority to and the benefit of Korean Patent Application No. 10-2018-0082378, filed on Jul. 16, 2018 in the Korean Intellectual Property Office, the entire content of which is hereby incorporated by reference.

BACKGROUND

1. Field

Aspects of embodiments of the present disclosure relate to a display device.

2. Description of the Related Art

A display device displays various images on a display screen to provide information to a user. Recently, a display device capable of folding or rolling with a bending flexible display member has been developed. Unlike flat panel display devices, flexible display devices may be folded or rolled like paper. The flexible display device having a shape which may be changed variously may be easy to carry, and may improve the convenience of a user.

The foldable display may be folded around a folding axis. The folded area of the foldable display may be deformed due to stress, or the resulting deformation may be seen as an external defect.

SUMMARY

According to an aspect of embodiments of the present disclosure, a display device with improved durability and display quality is provided.

According to one or more embodiments of the inventive concept, a display device including: a display module including a folding area that is configured to be in-folded around a folding axis, and non-folding areas adjacent to both sides of the folding area, the folding area and the non-folding areas configured to be defined on a plane, the display module configured to display an image; a support member at a lower part of the display module; an adhesive member between the display module and the support member; and a non-adhesive member between the adhesive member and the display module in the folding area.

In an embodiment, an adhesive force between the adhesive member and the non-adhesive member in the folding area may be less than an adhesive force between the adhesive member and the display module in the non-folding areas.

In an embodiment, a rigidity of the support member may be greater than a rigidity of the display module.

In an embodiment, the non-adhesive member may include fluorine or titanium.

In an embodiment, the non-adhesive member may have an integral shape.

In an embodiment, the non-adhesive member may be coupled to a lower surface of the display module.

In an embodiment, the non-adhesive member may have a shape coated on the lower surface of the display module.

In an embodiment, the support member may include: a first support part overlapping with each of a first non-folding area of the non-folding areas that is adjacent to a side of the folding area and a part of the folding area; and a second support part spaced apart from the first support part and overlapping with each of a second non-folding area of the non-folding areas that is adjacent to another side of the folding area and another part of the folding area.

In an embodiment, the adhesive member may include: a first adhesive member between the first support part and the first non-folding area; and a second adhesive member spaced from the first adhesive member and located between the second support part and the second non-folding area.

In an embodiment, as the display module is folded, a part of each of the first and second support parts overlapping with the folding area and a part of each of the first and second adhesive members may be spaced from the non-adhesive member.

In an embodiment, the non-adhesive member may include: a first non-adhesive member coupled to an upper surface of the first adhesive member overlapping with the folding area; and a second non-adhesive member coupled to a lower surface of the second adhesive member overlapping with the folding area.

In an embodiment, as the display module is folded, a part of each of the first and second support parts overlapping with the folding area, a part of each of the first adhesive member and the second adhesive member, the first non-adhesive member, and the second non-adhesive member may be spaced apart from the display module.

In an embodiment, the non-adhesive member may include: a first non-adhesive member coupled to a lower surface of the display module overlapping with the folding area; a second non-adhesive member coupled to an upper surface of the first adhesive member overlapping with the folding area; and a third non-adhesive member coupled to a lower surface of the second adhesive member overlapping with the folding area.

In an embodiment, as the display module is folded, a part of each of the first and second support parts overlapping with the folding area, a part of each of the first adhesive member and the second adhesive member, the second non-adhesive member, and the third non-adhesive member may be spaced apart from the first non-adhesive member.

In one or more embodiments of the inventive concept, a display device includes: a display module including a folding area that is configured to be in-folded around a folding axis, a first non-folding area at a side of the folding area, and a second non-folding area at another side of the folding area, the folding area and the first and second non-folding areas configured to be defined on a plane, the display module configured to display an image; a support member including a first support part at a lower portion of the first non-folding area and a second support part at a lower portion of the second non-folding area; and an adhesive member including a first adhesive member coupling the first support part and the display module in the first non-folding area, and a second adhesive member coupling the second support part and the display module in the second non-folding area, wherein a portion of the first adhesive member overlapping with the folding area and a portion of the second adhesive member overlapping with the folding area are not coupled with the display module.

In an embodiment, the display device may further include a non-adhesive member between the display module and the first adhesive member and between the display module and the second adhesive member in the folding area.

In an embodiment, a rigidity of the support member may be greater than a rigidity of the display module.

In an embodiment, the non-adhesive member may include fluorine or titanium.

In one or more embodiments of the inventive concept, a display device includes: a display module including a folding area configured to be folded around a folding axis, and non-folding areas adjacent to both sides of the folding area, the folding area and the non-folding areas configured to be defined on a plane, the display module configured to display an image; a support member at a lower portion of the display module; an adhesive member between the display module and the support member; and a non-adhesive member coupled to a lower surface of the display module in the folding area.

In an embodiment, the non-adhesive member may include fluorine or titanium.

BRIEF DESCRIPTION OF THE DRAWINGS

The accompanying drawings are included to provide a further understanding of the inventive concept, and are incorporated in and constitute a part of this specification. The drawings illustrate some exemplary embodiments of the inventive concept and, together with the description, serve to explain principles of the inventive concept. In the drawings.

DETAILED DESCRIPTION

Aspects and features of the inventive concept, and implementation methods thereof will be clarified through some exemplary embodiments described with reference to the accompanying drawings. The inventive concept may, however, be embodied in different forms and should not be construed as limited to the embodiments set forth herein. Rather, these embodiments are provided so that this disclosure will be thorough and complete, and will fully convey the scope of the inventive concept to those skilled in the art. Further, the inventive concept is defined by the scope of the claims. Like reference numbers refer to like elements throughout the specification.

It is to be understood that when an element, such as a layer, film, region, or substrate, is referred to as being "on" another element, it may be directly on the other element or one or more intervening elements may also be present.

On the other hand, when an element is referred to as being "directly on" another element, it is to be understood that there is no other device or layer therebetween. As used herein, the term "and/or" includes any and all combinations of one or more of the associated listed items.

Spatially relative terms, such as "below," "beneath," "lower," "above," and "upper," as described with respect to the drawings, may be used to easily describe a relationship between one device or element and another device or component. Spatially relative terms should be understood as terms including different directions of a device when used or operating in addition to a direction shown in the drawing.

Although the terms "first" and "second" may be used to describe various devices, components, and/or sections, it is to be understood that they are not limited to those terms. These terms are used to distinguish one device, component, or section from another device, component, or section. Accordingly, a first device, a first component, or a first section, mentioned below, may be a second device, a second component, or a second section within the technical scope of the inventive concept.

Additionally, embodiments described in this specification may be described with plan views or cross-sectional views, which may be idealized exemplary views of the inventive concept. Accordingly, shapes of the exemplary views may be modified according to manufacturing techniques and/or allowable errors. Therefore, the embodiments of the inventive concept are not limited to the specific shapes illustrated in the exemplary views, but may include other shapes that may be created according to manufacturing processes. Areas exemplified in the drawings may have general properties, and may be used to illustrate a specific shape, such as of a semiconductor package region. Thus, this should not be construed as limiting the scope of the inventive concept.

The terminology used herein is for the purpose of describing particular embodiments and is not intended to be limiting of example embodiments. As used herein, the singular forms "a," "an," and "the" are intended to include the plural forms as well, unless the context clearly indicates otherwise. It is to be further understood that the terms "comprises," "comprising," "includes," and/or "including," if used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which example embodiments of the inventive concept belong. It is to be further understood that terms, such as those defined in commonly-used dictionaries, should be interpreted as having a meaning that is consistent with their meaning in the context of the relevant art and will not be interpreted in an idealized or overly formal sense unless expressly so defined herein.

Herein, some exemplary embodiments of the inventive concept will be described in further detail with reference to the accompanying drawings.

Figure 1:
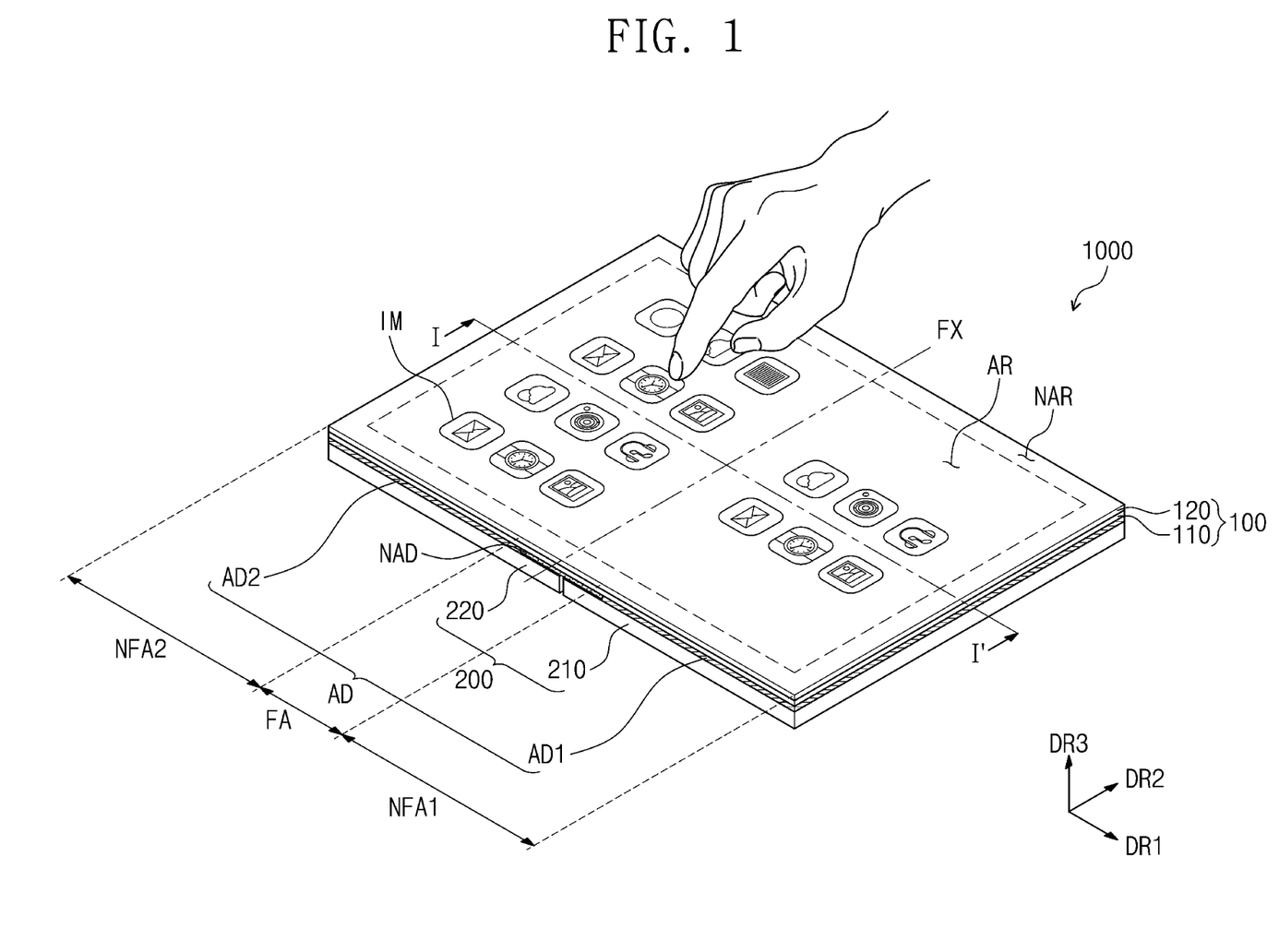
FIG. 1 is a perspective view of a display device according to an embodiment of the inventive concept.
Figure 2:
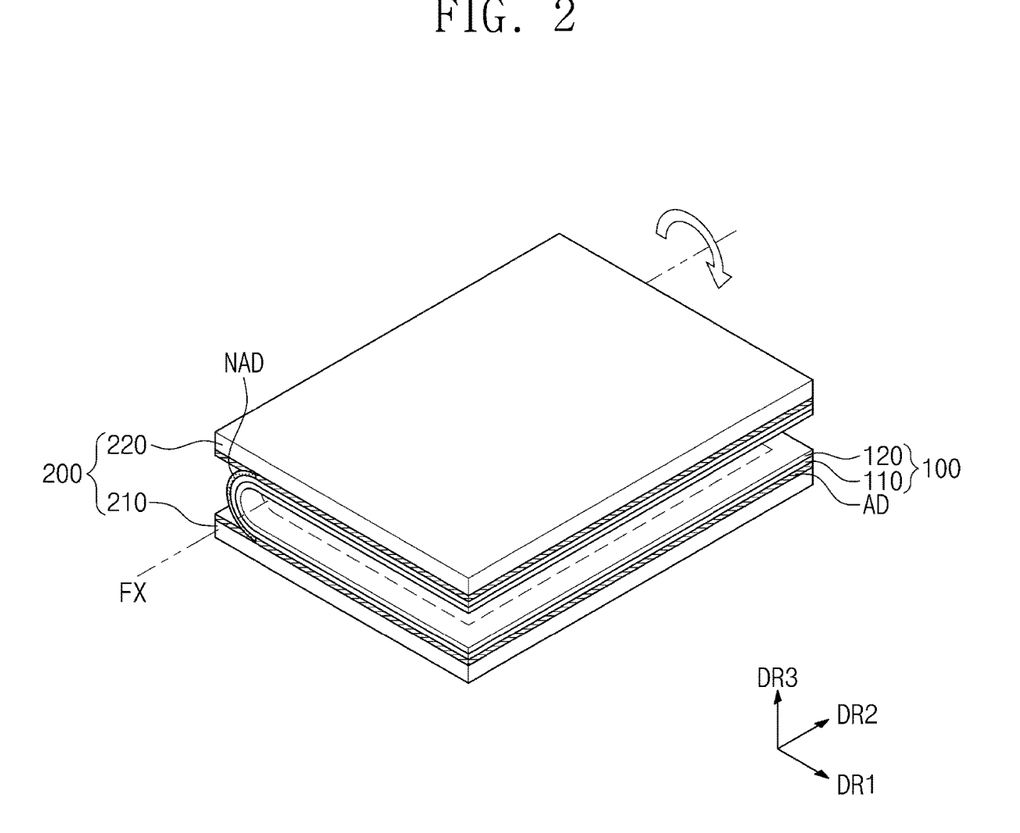
FIG. 2 is a perspective view showing an in-folded state of the display device shown in FIG. 1.
Figure 3:
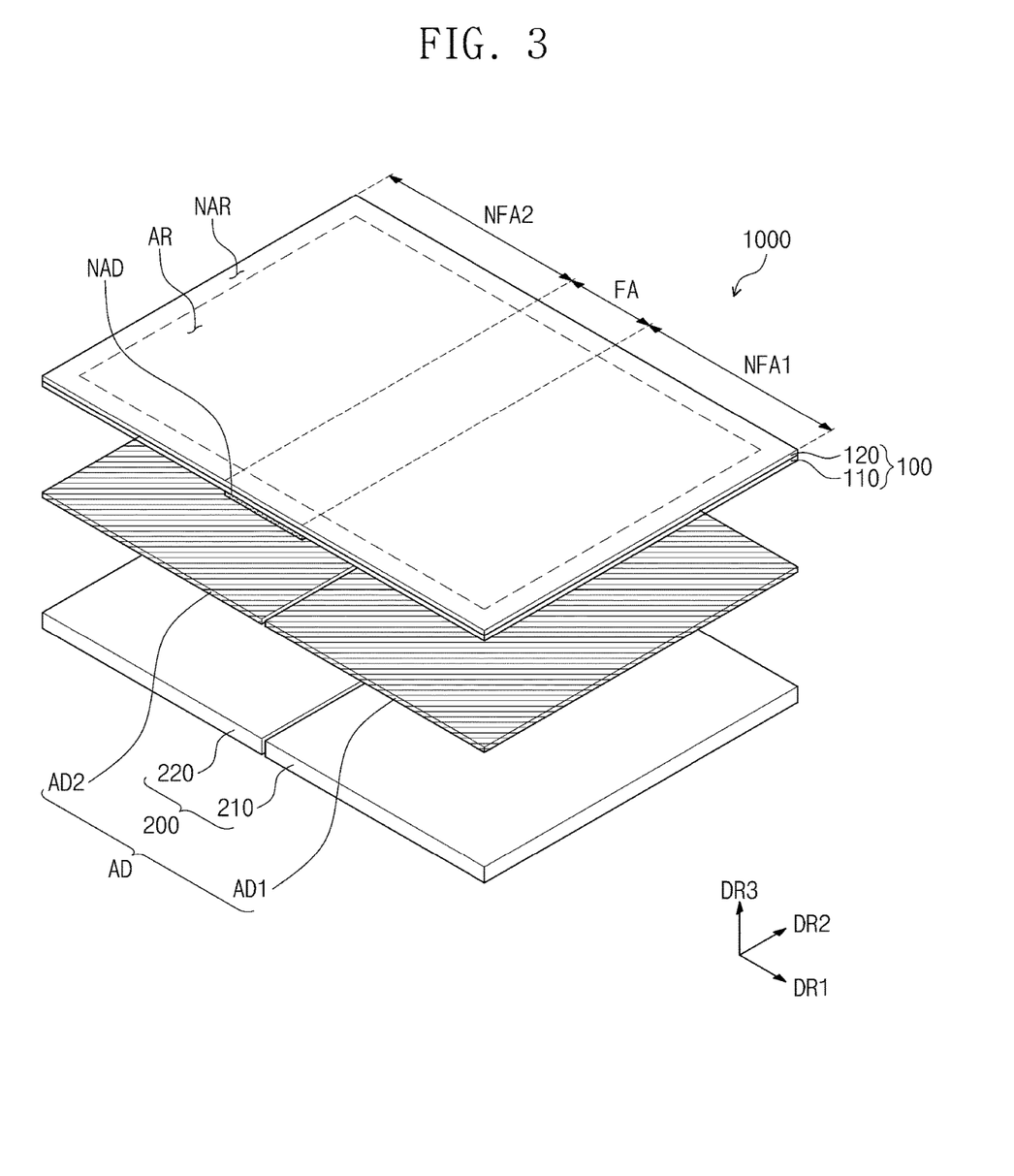
FIG. 3 is an exploded perspective view of the display device shown in FIG. 1.

FIG. 1 is a perspective view of a display device according to an embodiment of the inventive concept; FIG. 2 is a perspective view showing an in-folded state of the display device shown in FIG. 1; and FIG. 3 is an exploded perspective view of the display device shown in FIG. 1.

Referring to FIGS. 1 and 2, a display device 1000 according to an embodiment of the inventive concept has long sides in a first direction DR1 and short sides in a second direction DR2 that intersects the first direction DR1. However, the display device 1000 according to another embodiment of the inventive concept is not limited thereto and may have any of various shapes.

The display device 1000 may be a flexible display device 1000. The display device 1000 according to an embodiment of the inventive concept may be folded or unfolded based on a folding axis FX extending in a direction (e.g., a predetermined direction). That is, the display device 1000 may be a foldable display. In one embodiment of the invention, the folding axis FX may extend in the second direction DR2.

The display device 1000 may be divided into a plurality of areas according to folding. The display device 1000 may be divided into a folding area FA arranged on a plane and one or more non-folding areas NFA1 and NFA2. The folding area FA is an area to which a folding stress due to folding is applied. On a plane, the folding area FA overlaps the folding axis FX.

According to the present embodiment, the folding area FA of the display device 1000 may be defined between two non-folding areas NFA1 and NFA2. Herein, the non-folding areas NFA1 and NFA2 are referred to as a first non-folding area NFA1 and a second non-folding area NFA2, respectively. The first non-folding area NFA1 may be adjacent to one side of the folding area FA in the first direction DR1, and the second non-folding area NFA2 may be adjacent to the other side of the folding area FA in the first direction DR1.

The folding area FA, the first non-folding area NFA1, and the second non-folding area NFA2 may also be defined on the plane of the members included in the display device 1000.

In the present embodiment, one folding area FA may be defined in the display device 1000, but the inventive concept is not limited thereto. According to another embodiment of the inventive concept, a plurality of folding areas may be defined in the display device 1000.

The display device 1000 according to an embodiment of the inventive concept may be in-folded. That is, the upper surface of the display device 1000 defined as the display surface to display an image IM may be folded so as to face itself. Therefore, in the in-folded state, the display surface of the display device 1000 may be covered by the bottom surface facing the display surface, such that it may be protected from the outside.

Referring to FIGS. 1 to 3, the display device 1000 according to an embodiment includes a display module 100, a support member 200, an adhesive member AD, and at least one non-adhesive member NAD.

The display module 100 may be divided into an active region AR and a peripheral region NAR on a plane defined by the first direction DR1 and the second direction DR2. In an embodiment, the active region AR may be defined at the center of the display module 100 on a plane. The peripheral region NAR may be adjacent to the active region AR. In an embodiment, the peripheral region NAR may surround the active region AR. In this embodiment, the peripheral region NAR may be defined as a frame shape surrounding the active region AR.

However, the inventive concept is not limited to the shape and the number of the active region AR and the peripheral region NAR. The display module 100 according to another embodiment of the inventive concept may include only the active region AR and a plurality of active regions may be provided and be spaced apart from each other.

The display module 100 may include a display member 110 and an input sensing member 120.

The display member 110 may be a base layer on which the input sensing member 120 is disposed. For example, the display member 110 may include an insulating substrate or an insulating film. The display member 110 may display the image IM (see FIG. 1) in the active region AR.

The support member 200 may be disposed below the display module 100 to support the display module 100. The support member 200 may have a plate shape. The rigidity of the support member 200 may be greater than the rigidity of the display module 100. For example, the support member 200 may include a metallic material. However, the inventive concept is not particularly limited to the material of the support member 200.

The support member 200 may include a first support part 210 and a second support part 220. The first support part 210 may be disposed to overlap with one side of the display module 100 in the first direction DR1. In an embodiment, the first support part 210 may overlap with and support a part of the folding area FA and the first non-folding area NFA1. The second support part 220 may be disposed to overlap with the other side of the display module 100 in the first direction DR1. In an embodiment, the second support part 220 may overlap with and support another part or a remaining part of the folding area FA and the second non-folding area NFA2. The first support part 210 and the second support part 220 may be spaced apart from each other.

The adhesive member AD may be disposed between the display module 100 and the support member 200. The adhesive member AD may couple the display module 100 and the support member 200 in the non-folding areas NFA1 and NFA2.

The adhesive member AD may include a first adhesive member AD1 and a second adhesive member AD2. The first adhesive member AD1 and the second adhesive member AD2 may be spaced apart from each other in the first direction DR1. The first adhesive member AD1 may be disposed between the first support part 210 and the first non-folding area NFA1. The second adhesive member AD2 may be disposed between the second support part 220 and the second non-folding area NFA2.

In an embodiment, the first and second adhesive members AD1 and AD2 may be disposed to overlap with the folding area FA. The first and second adhesive members AD1 and AD2 may be disposed between the first and second support parts 210 and 220 and the display module 100 in the folding area FA to support the display module 100.

The adhesive member AD according to an embodiment of the inventive concept may include a thermosetting resin or a photocurable resin.

The non-adhesive member NAD may be disposed between the first and second adhesive members AD1 and AD2 and the display module 100. The non-adhesive member NAD may be coupled to the lower surface of the display module 100. The non-adhesive member NAD may serve to reduce the coupling force between the adhesive member AD and the display module 100 in the folding area FA. In an embodiment, for example, the non-adhesive member NAD may include fluorine or titanium. The non-adhesive member NAD may be disposed to overlap with the folding area FA. Herein, the non-adhesive member NAD will be described in more detail later with reference to FIGS. 6 and 7.

Figure 4:
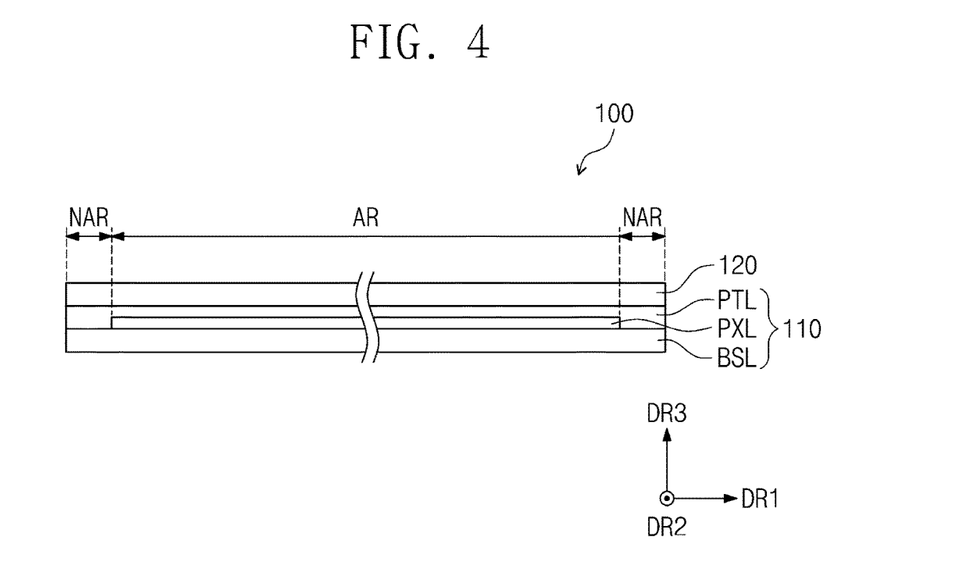
FIG. 4 is a cross-sectional view of a display module shown in FIGS. 1 to 3.

FIG. 4 is a cross-sectional view of the display module 100 shown in FIGS. 1 to 3.

Referring to FIG. 4, the display member 110 may include a base layer BSL, a pixel layer PXL, and a protective layer PTL. The base layer BSL may define a back surface of the display module 100. The base layer BSL may be made of a flexible material.

The pixel layer PXL may be disposed on the base layer BSL. The pixel layer PXL may include a plurality of pixels. The pixels may receive an electrical signal to generate the image IM.

According to an embodiment of the inventive concept, the type of the display member 110 may be determined according to a configuration of the pixel layer PXL. For example, the display member 110 may be a liquid crystal display panel, an organic light emitting display panel, an electrophoretic display panel, an electrowetting display panel, or any one of various display panels capable of displaying other images. In addition, the display member 110 of the inventive concept may include any of various embodiments and is not limited to any one embodiment.

Figure 5:
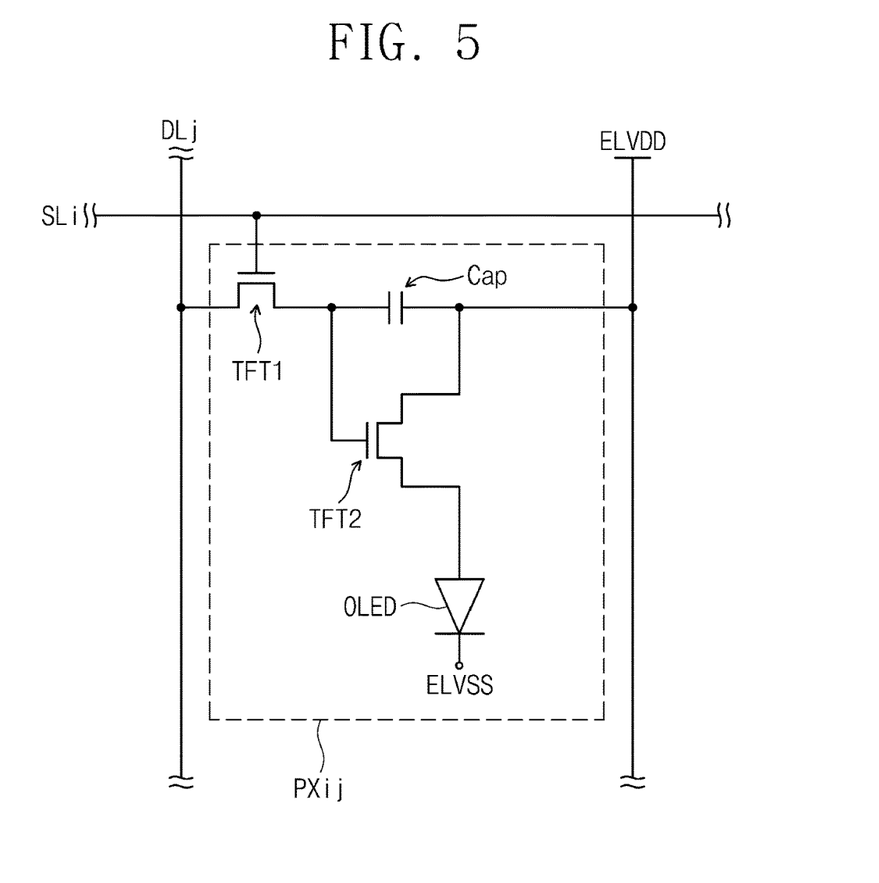
FIG. 5 is an equivalent circuit diagram showing one pixel of a display device.

FIG. 5 is an equivalent circuit diagram showing one pixel of a display device according to an embodiment.

In an embodiment, referring to FIG. 5, the display member 110 may be an organic light emitting display panel. Accordingly, one pixel PXij may include at least one thin film transistor, at least one capacitor, and at least one display element. In this embodiment, the pixel PXij may include a first thin film transistor TFT1, a second thin film transistor TFT2, a capacitor Cap, and an organic light emitting element OLED.

The first thin film transistor TFT1 may include a control electrode connected to an i-th scan line SLi, an input electrode connected to a j-th data line DLj, and an output electrode. The first thin film transistor TFT1 may output a data signal applied to the j-th data line DLj in response to a scan signal applied to the i-th scan line SLi.

The capacitor Cap may include a first capacitor electrode connected to the first thin film transistor TFT1 and a second capacitor electrode receiving a first power source voltage ELVDD. The capacitor Cap may charge the amount of charge corresponding to the difference between the voltage corresponding to the data signal received from the first thin film transistor TFT1 and the first power source voltage ELVDD.

The second thin film transistor TFT2 may include a control electrode connected to the output electrode of the first thin film transistor TFT1 and the first capacitor electrode of the capacitor Cap, an input electrode receiving the first power source voltage ELVDD, and an output electrode. The output electrode of the second thin film transistor TFT2 may be connected to the organic light emitting element OLED.

The second thin film transistor TFT2 may control the driving current flowing in the organic light emitting element OLED in correspondence to the amount of charge stored in the capacitor Cap. The turn-on time of the second thin film transistor TFT2 may be determined according to the amount of charge charged in the capacitor Cap. Substantially, the output electrode of the second thin film transistor TFT2 may supply a voltage lower than the first power source voltage ELVDD to the organic light emitting element OLED.

The organic light emitting element OLED may include a first electrode connected to the second thin film transistor TFT2 and a second electrode receiving a second power source voltage ELVSS. The organic light emitting element OLED may include a light emission pattern disposed between the first electrode and the second electrode.

The organic light emitting device OLED may emit light during the turn-on section of the second thin film transistor TFT2. The color of the light generated in the organic light emitting element OLED may be determined by a substance that forms a light emission pattern. For example, the color of light generated in the organic light emitting element OLED may be any one of red, green, blue, and white.

The protective layer PTL may be disposed on the pixel layer PXL to cover the pixel layer PXL. The protective layer PTL electrically isolates the pixel layer PXL from the input sensing member 120.

For example, the protective layer PTL may be a sealing layer that encloses the pixel layer PXL. In an embodiment, the protective layer PTL may include a plurality of stacked organic layers and/or inorganic layers.

Alternatively, the protective layer PTL may be a planarization layer for planarizing the upper surface of the pixel layer PXL. The protective layer PTL according to an embodiment of the inventive concept may be provided in any of various forms, and is not limited to any one embodiment.

Referring again to FIG. 4, the input sensing member 120 may be disposed on the protective layer PTL. The active region AR of the input sensing member 120 may substantially overlap with the area where the pixel layer PXL is disposed.

The input sensing member 120 may sense an external input provided to the active region AR of the display module 100.

The external input may be provided in any of various ways. In FIG. 1, an embodiment for detecting an external input inputted through a part of a user's body (for example, a finger) is shown. This is illustratively shown, and the external input provided to the input sensing member 120 is not limited to any one method. According to another embodiment of the inventive concept, the external input may be inputted in an optical, touching, magnetic, or other manner.

Although not shown in the drawings, the input sensing member 120 may include an input sensing cell including a plurality of input sensing sensors for sensing an external input, driving wires for transmitting an electric signal to the input sensing cell or an electric signal generated by the input sensing cell to the outside, and pads. The pad may be connected to the display member 110 or may be connected to an external power supply device (not shown).

The input sensing member 120 may sense an external input by various methods. For example, the input sensing member 120 may be driven by a capacitive, resistive, or coordinate recognition scheme.

Figure 6:
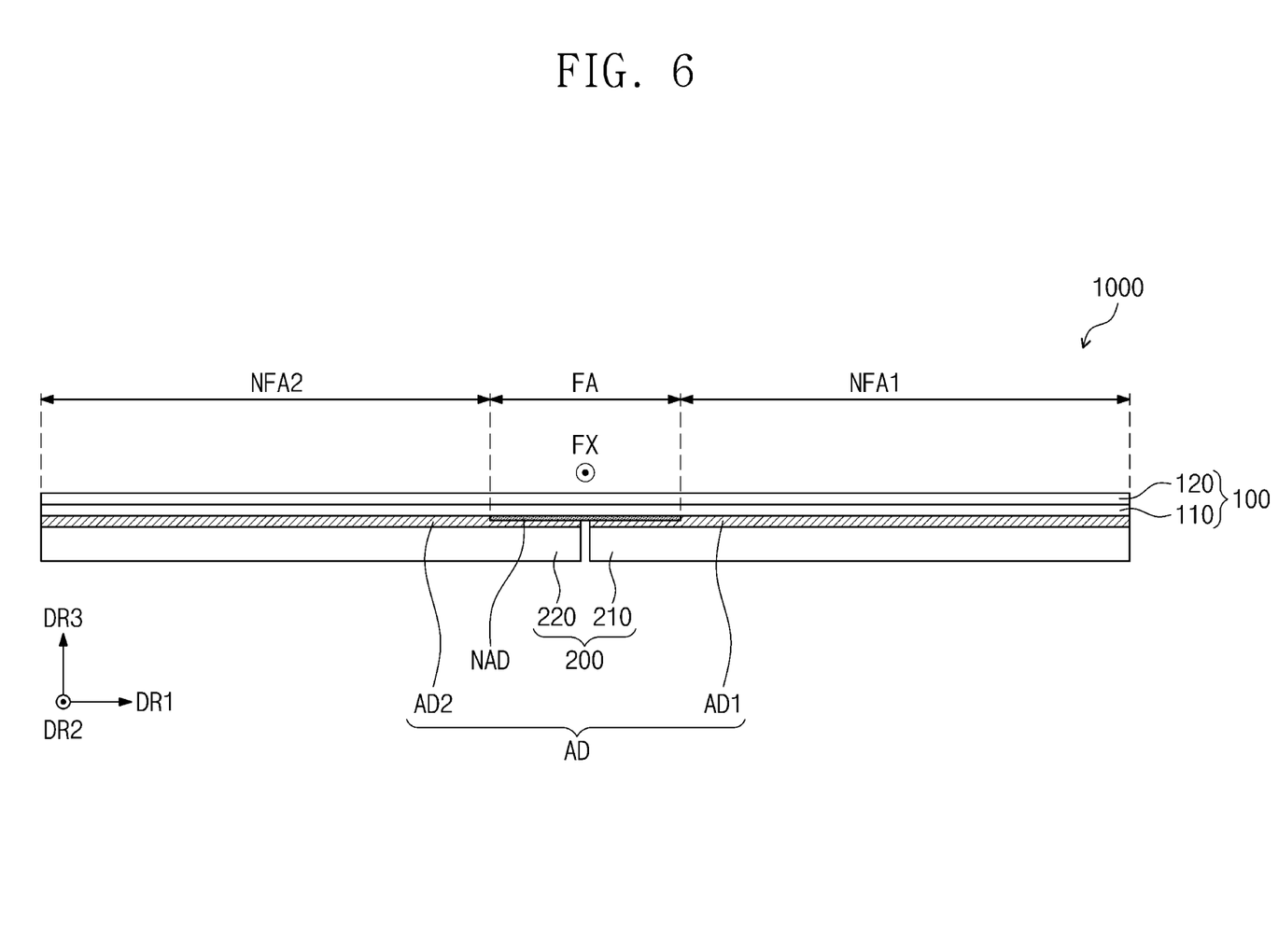
FIG. 6 is a cross-sectional view taken along the line I-I' of FIG. 1.
Figure 7:
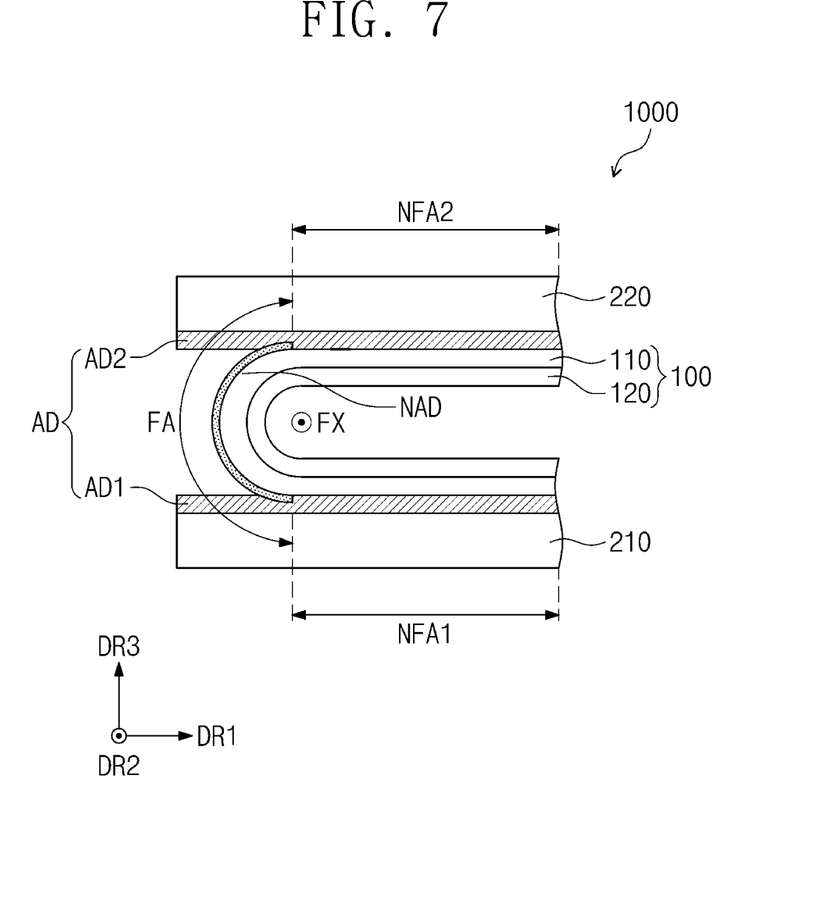
FIG. 7 is a cross-sectional view showing an in-folded state of the display device shown in FIG. 6.

FIG. 6 is a cross-sectional view taken along the line I-I' shown in FIG. 1; and FIG. 7 is a cross-sectional view illustrating an in-folded state of the display device shown in FIG. 6.

Referring to FIGS. 6 and 7, as described above, the non-adhesive member NAD may be disposed between the display module 100 and the adhesive member AD.

According to an embodiment, the non-adhesive member NAD may be provided as one. The non-adhesive member NAD may be attached to the lower surface of the display module 100. The lower surface of the display member 110 may be a surface spaced apart from the input sensing member 120 among the both sides of the display member 110.

In an embodiment, the non-adhesive member NAD may have a shape coated on the lower surface of the display module 100. However, the inventive concept is not particularly limited to the form of the non-adhesive member NAD. For example, the non-adhesive member NAD according to another embodiment of the inventive concept may be attached to the lower surface of the display module 100 in the form of a film or sheet.

The non-adhesive member NAD may overlap with the folding area FA. In an embodiment, the non-adhesive member NAD may not overlap with the first non-folding area NFA1 and the second non-folding area NFA2.

In an embodiment, the non-adhesive member NAD may include fluorine or titanium. For example, the non-adhesive member NAD may be a coating by an anti-finger coating. In an embodiment, the thickness of the non-adhesive member NAD may be less than about 1 μm.

In an embodiment, the adhesive force between the adhesive member AD and the non-adhesive member NAD in the folding area FA may be weaker than the adhesive force between the adhesive member AD and the display module 100 in the non-folding areas NFA1 and NFA2.

The non-adhesive member NAD serves to reduce the coupling force between the adhesive member AD and the display module 100. Therefore, the adhesive member AD and the display module 100 may not be coupled in the folding area FA where the non-adhesive member NAD is disposed.

The lower surface of the display module 100 overlapping with the first non-folding area NFA1 may be coupled with the first adhesive member AD1, and the lower surface of the display module 100 overlapping with the second non-folding area NFA2 may be coupled with the second adhesive member AD2.

According to the present embodiment, as the display module 100 is folded, a part of the lower surface of the display module 100 overlapping with the folding area FA may be spaced from the adhesive member AD by the non-adhesive member NAD. In other words, as the display module 100 is folded, a part of each of the first and second support parts 210 and 220 overlapping with the folding area FA and a part of each of the first and second adhesive members AD1 and AD2 may be spaced apart from the non-adhesive member NAD.

Therefore, even if the display module 100 is folded, the first and second support parts 210 and 220 having a relatively large rigidity may not be folded. Therefore, the stress applied to the folding area FA of the display module 100 may be reduced.

In general, fatigue may be accumulated in the display module overlapping with the folding area by the repeated folding and unfolding operation of the display device. Accordingly, the shape of the display module corresponding to the folding area may be changed.

Unlike the embodiment of the inventive concept, if the adhesive member AD is not disposed in the folding area FA but only in the non-folding area NFA, an empty space may be formed between the display module 100 and the support member 200 in the folding area FA. Therefore, the folding area FA of the display module 100 in which fatigue is accumulated is not supported by the support member 200 and the adhesive member AD, but may be recessed into the void space by gravity. As a result, the display quality of the display device 1000 may be deteriorated or a defect may occur. However, according to the present embodiment, when the first adhesive member AD1 and the second adhesive member AD2 overlap with the folding area FA such that the display device 1000 has an unfolded state, the display module 100 overlapping with the folding area FA may be supported by the adhesive member AD.

Since the adhesive member AD has an integral shape, when the image is displayed in the unfolded state, the folding area FA of the display module 100 may be supported by the adhesive member AD. Therefore, according to the present embodiment, the phenomenon that the shape of the display module 100 is changed may be avoided, and the display quality of the display device 1000 may be prevented or substantially prevented from deteriorating.

Figure 8:
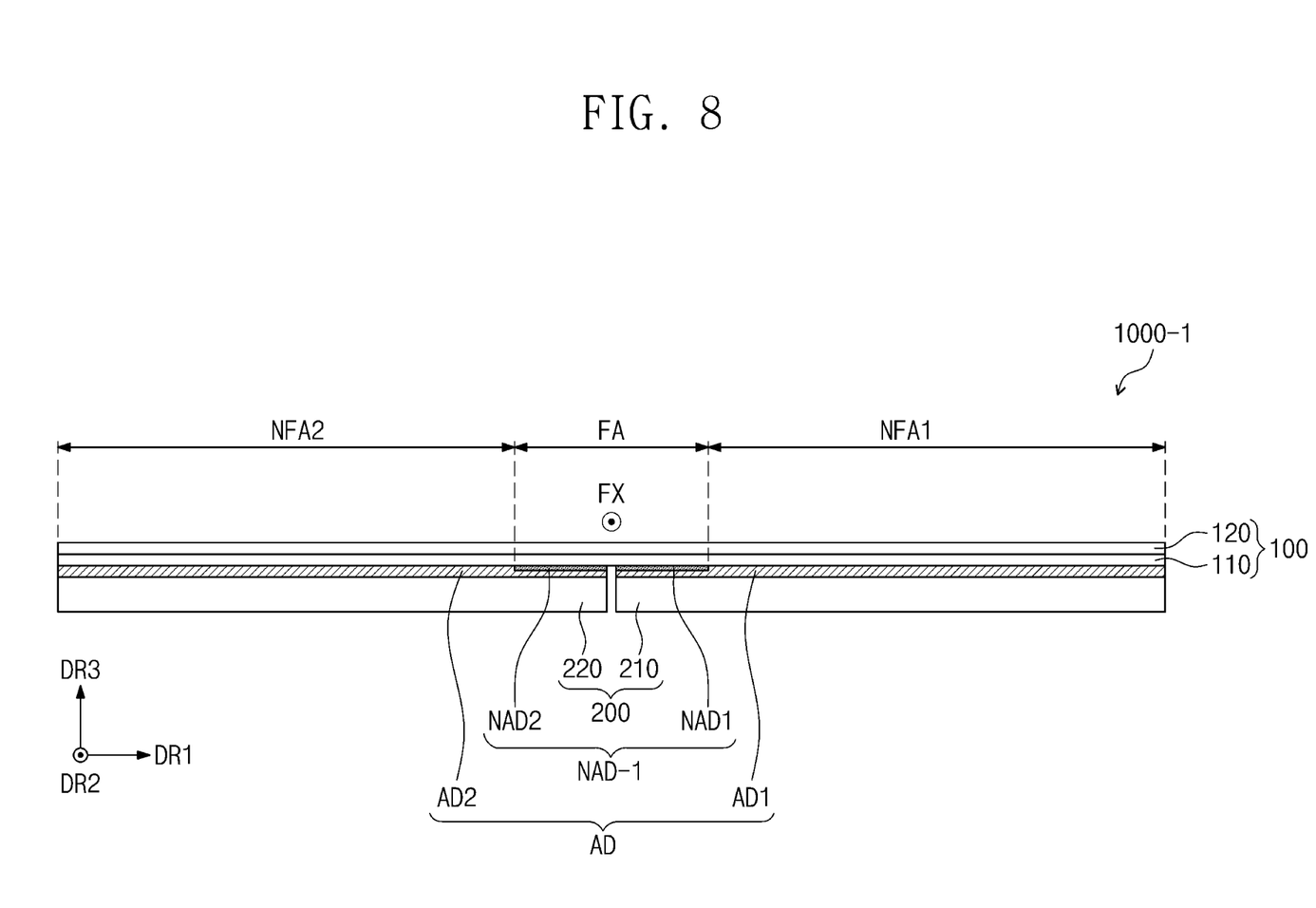
FIG. 8 is a cross-sectional view of a display device according to another embodiment of the inventive concept.
Figure 9:
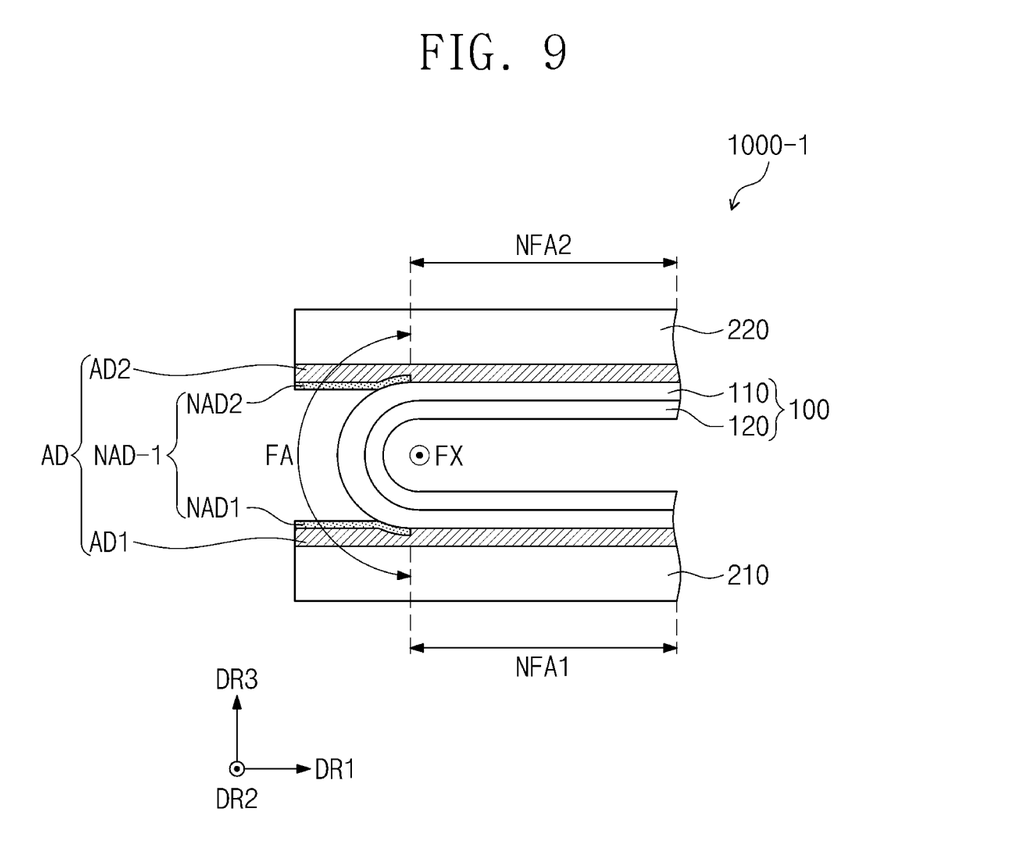
FIG. 9 is a cross-sectional view showing an in-folded state of the display device shown in FIG. 8.

FIG. 8 is a cross-sectional view of a display device according to another embodiment of the inventive concept; and FIG. 9 is a cross-sectional view illustrating an in-folded state of the display device shown in FIG. 8.

For convenience of explanation, differences from the previously described embodiment of the inventive concept will be mainly described, and omitted parts follow an embodiment of the inventive concept. Additionally, like reference numerals refer to like components throughout and overlapping descriptions of the components will be omitted.

Referring to FIGS. 8 and 9, a non-adhesive member NAD-1 of a display device 1000-1 according to another embodiment of the inventive concept may include a first non-adhesive member NAD1 and a second non-adhesive member NAD2.

The first non-adhesive member NAD1 may be coupled to the upper surface of the first adhesive member AD1 overlapping with the folding area FA. The second non-adhesive member NAD2 may be coupled to the upper surface of the second adhesive member AD2 overlapping with the folding area FA.

In an embodiment, the first and second non-adhesive members NAD1 and NAD2 are not coupled to the lower surface of the display module 100.

The first and second non-adhesive members NAD1 and NAD2 may be spaced apart from each other. In an embodiment of the inventive concept, it is exemplarily shown that the first and second non-adhesive members NAD1 and NAD2 are spaced by a distance equal to the distance between the first adhesive member AD1 and the second adhesive member AD2. However, the inventive concept is not limited thereto, and the first and second non-adhesive members NAD1 and NAD2 may be spaced more apart than the separation distance between the first adhesive member AD1 and the second adhesive member AD2.

In an embodiment, each of the first and second non-adhesive members NAD1 and NAD2 may have a shape coated on the upper surface of each of the first and second adhesive members AD1 and AD2. However, the inventive concept is not particularly limited to the shapes of the first and second non-adhesive members NAD1 and NAD2.

According to this embodiment, as the display module 100 is folded, a part of the lower surface of the display module 100 overlapping with the folding area FA may be separated from the first and second adhesive members AD1 and AD2 by the first and second non-adhesive members NAD1 and NAD2, respectively. That is, as the display module 100 is folded, a part of each of the first and second support parts 210 and 220 overlapping with the folding area FA, a part of the first and second adhesive members AD1 and AD2, the first non-adhesive member NAD1, and the second non-adhesive member NAD2 may be spaced from the display module 100.

Therefore, even if the display module 100 is folded, the first and second support parts 210 and 220 having a relatively large rigidity may not be folded. Therefore, the stress applied to the folding area FA of the display module 100 may be reduced.

Figure 10:
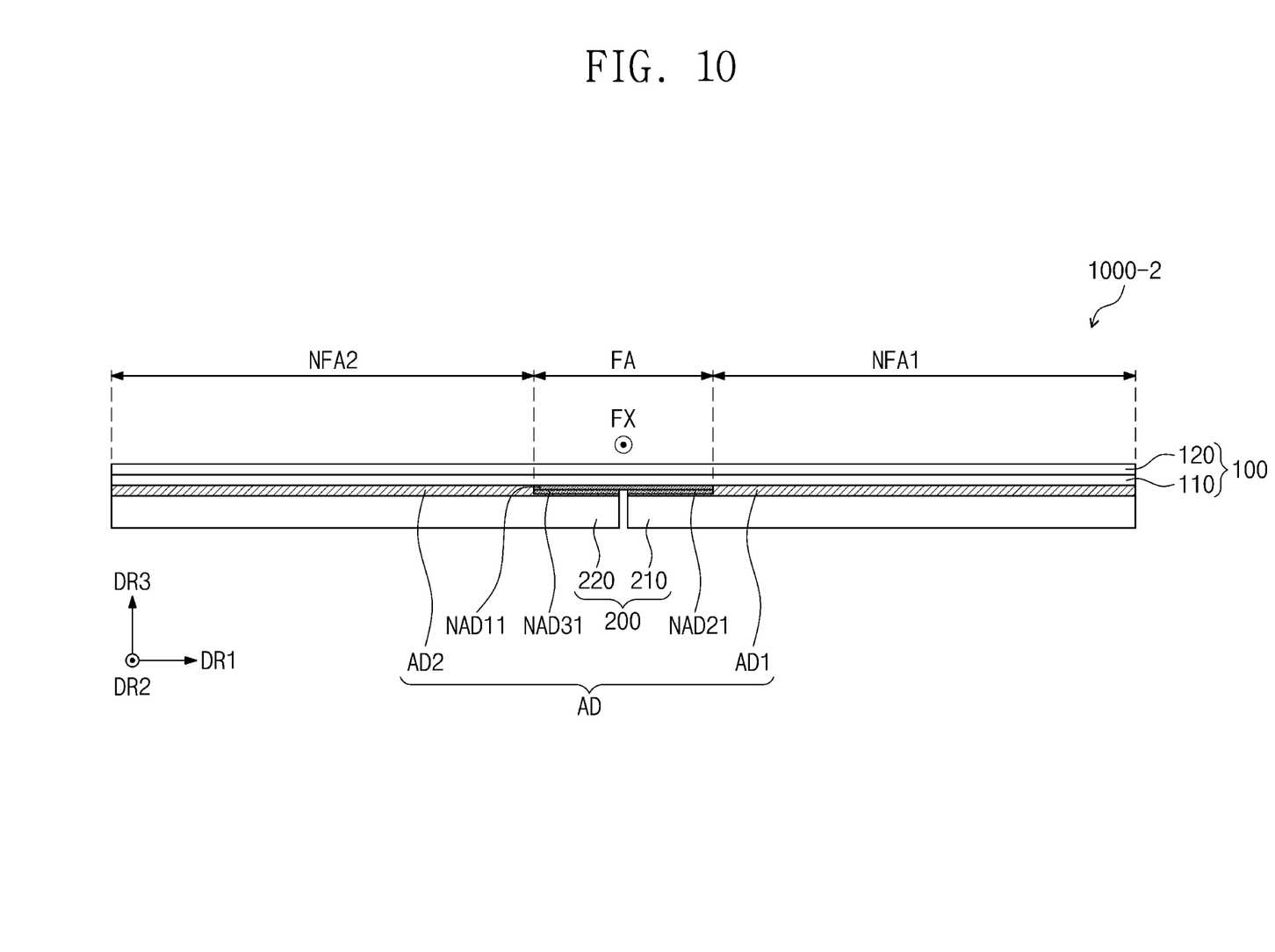
FIG. 10 is a cross-sectional view of a display device according to another embodiment of the inventive concept.
Figure 11:
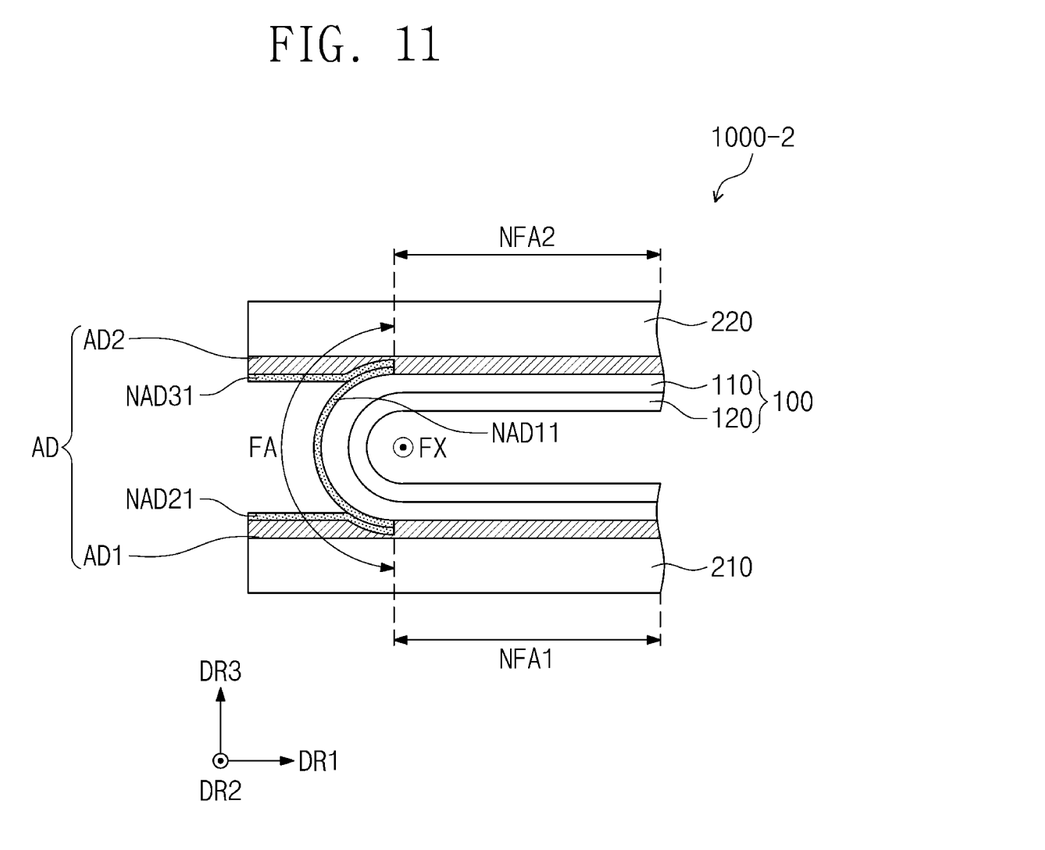
FIG. 11 is a cross-sectional view showing an in-folded state of the display device shown in FIG. 10.

FIG. 10 is a cross-sectional view of a display device according to another embodiment of the inventive concept;

and FIG. 11 is a cross-sectional view illustrating an in-folded state of the display device shown in FIG. 10.

For convenience of explanation, differences from the previously described embodiment of the inventive concept will be mainly described, and omitted parts follow an embodiment of the inventive concept. Additionally, like reference numerals refer to like components throughout and overlapping descriptions of the components will be omitted.

A display device 1000-2 according to another embodiment of the inventive concept may include first, second, and third non-adhesive members NAD11, NAD21, and NAD31.

The first non-adhesive member NAD11 may be substantially the same as the non-adhesive member NAD described with reference to FIGS. 6 and 7, and the second and third non-adhesive members NAD21 and NAD31 may be substantially the same as the first and second non-adhesive members NAD1 and NAD2 described with reference to FIGS. 8 and 9.

The first, second, and third non-adhesive members NAD11, NAD21, NAD31 may overlap with the folding area FA.

The first non-adhesive member NAD11 may be coupled to the lower surface of the display module 100.

The second non-adhesive member NAD21 may be coupled to the upper surface of the first adhesive member AD1 overlapping with the folding area FA. The third non-adhesive member NAD31 may be coupled to the upper surface of the second adhesive member AD2 overlapping with the folding area FA.

Each of the second and third non-adhesive members NAD21 and NAD31 may overlap with the first non-adhesive member NAD11. When the display device 1000-2 is in the unfolded state, each of the second and third non-adhesive members NAD21 and NAD31 contacts but is not coupled to the first non-adhesive member NAD11.

The second and third non-adhesive members NAD21 and NAD31 may be spaced apart from one another and, in an embodiment, for example, may be spaced more than the spacing between the first adhesive member AD1 and the second adhesive member AD2.

According to the present embodiment, as the display module 100 is folded, a part of the lower surface of the display module 100 overlapping with the folding area FA may be spaced apart from each of the first and second adhesive members AD1 and AD2 by the first to third non-adhesive members NAD11, NAD21, and NAD31. That is, as the display module 100 is folded, a part of each of the first and second support parts 210 and 220 overlapping with the folding area FA, a part of the first and second adhesive members AD1 and AD2, the second non-adhesive member NAD21, and the third non-adhesive member NAD31 may be spaced from the first non-adhesive member NAD11.

Therefore, even if the display module 100 is folded, the first and second support parts 210 and 220 having a relatively large rigidity may not be folded. Therefore, the stress applied to the folding area FA of the display module 100 may be reduced.

According to embodiments of the inventive concept, the durability and display quality of the display device may be improved.

Although some exemplary embodiments of the inventive concept have been described, it is to be understood that the inventive concept is not limited to these exemplary embodiments, but various changes and modifications may be made by one of ordinary skill in the art within the spirit and scope of the inventive concept as set forth in the claims.

What is claimed is:

1. A display device comprising:
a display module comprising a folding area that is configured to be in-folded around a folding axis, and non-folding areas adjacent to both sides of the folding area, the folding area and the non-folding areas configured to be defined on a plane, the display module configured to display an image;
a support member at a lower part of the display module;
an adhesive member between the display module and the support member, an adhesive portion of the adhesive member extending into the folding area; and
a non-adhesive member between the adhesive member and the display module in the folding area,
wherein the non-adhesive member is disposed on the adhesive portion extending into the folding area.

2. The display device of claim 1, wherein an adhesive force between the adhesive member and the non-adhesive member in the folding area is less than an adhesive force between the adhesive member and the display module in the non-folding areas.

3. The device of claim 1, wherein a rigidity of the support member is greater than a rigidity of the display module.

4. The display device of claim 1, wherein the non-adhesive member comprises fluorine or titanium.

5. The display device of claim 1, wherein the non-adhesive member has an integral shape.

6. The display device of claim 1, wherein the non-adhesive member is coupled to a lower surface of the display module.

7. The display device of claim 6, wherein the non-adhesive member has a shape coated on the lower surface of the display module.

8. The display device of claim 1, wherein the support member comprises:
a first support part overlapping with each of a first non-folding area of the non-folding areas that is adjacent to a side of the folding area and a part of the folding area; and
a second support part spaced apart from the first support part and overlapping with each of a second non-folding area of the non-folding areas that is adjacent to another side of the folding area and another part of the folding area.

9. The display device of claim 8, wherein the adhesive member comprises:
a first adhesive member between the first support part and the first non-folding area; and
a second adhesive member spaced from the first adhesive member and located between the second support part and the second non-folding area.

10. The display device of claim 9, wherein, when the display module is folded, a part of each of the first and second support parts overlapping with the folding area and a part of each of the first and second adhesive members are spaced from the non-adhesive member.

11. The display device of claim 9, wherein the non-adhesive member comprises:
a first non-adhesive member coupled to an upper surface of the first adhesive member overlapping with the folding area; and
a second non-adhesive member coupled to an upper surface of the second adhesive member overlapping with the folding area.

12. The display device of claim 11, wherein, when the display module is folded, a part of each of the first and second support parts overlapping with the folding area, a part of each of the first adhesive member and the second adhesive member, the first non-adhesive member, and the second non-adhesive member are spaced apart from the display module.

13. The display device of claim 9, wherein the non-adhesive member comprises:
a first non-adhesive member coupled to a lower surface of the display module overlapping with the folding area;
a second non-adhesive member coupled to an upper surface of the first adhesive member overlapping with the folding area; and
a third non-adhesive member coupled to an upper surface of the second adhesive member overlapping with the folding area.

14. The display device of claim 13, wherein, when the display module is folded, a part of each of the first and second support parts overlapping with the folding area, a part of each of the first adhesive member and the second adhesive member, the second non-adhesive member, and the third non-adhesive member are spaced apart from the first non-adhesive member.

15. A display device comprising:
a display module comprising a folding area that is configured to be in-folded around a folding axis, a first non-folding area at a side of the folding area, and a second non-folding area at another side of the folding area, the folding area and the first and second non-folding areas configured to be defined on a plane, the display module configured to display an image;
a support member comprising a first support part at a lower portion of the first non-folding area and a second support part at a lower portion of the second non-folding area; and
an adhesive member comprising a first adhesive member coupling the first support part and the display module in the first non-folding area, and a second adhesive member coupling the second support part and the display module in the second non-folding area, an adhesive portion of the adhesive member extending into the folding area,
wherein a portion of the first adhesive member overlapping with the folding area and a portion of the second adhesive member overlapping with the folding area are not coupled with the display module, and
wherein the non-adhesive member is disposed on the adhesive portion extending into the folding area.

16. The display device of claim 15, further comprising a non-adhesive member between the display module and the first adhesive member and between the display module and the second adhesive member in the folding area.

17. The display device of claim 16, wherein the non-adhesive member comprises fluorine or titanium.

18. The display device of claim 15, wherein a rigidity of the support member is greater than a rigidity of the display module.

19. A display device comprising:
a display module comprising a folding area configured to be folded around a folding axis, and non-folding areas adjacent to both sides of the folding area, the folding area and the non-folding areas configured to be defined on a plane, the display module configured to display an image;
a support member at a lower portion of the display module;
an adhesive member between the display module and the support member, an adhesive portion of the adhesive member extending into the folding area; and
a non-adhesive member coupled to a lower surface of the display module in the folding area,
wherein the non-adhesive member is disposed on the adhesive portion extending into the folding area.

20. The display device of claim 19, wherein the non-adhesive member comprises fluorine or titanium.

* * * * *